US010612238B2

(12) United States Patent
Chihlas et al.

(10) Patent No.: US 10,612,238 B2
(45) Date of Patent: *Apr. 7, 2020

(54) ELECTRICAL WIRING SYSTEMS FOR USE IN ROOFING APPLICATIONS

(71) Applicant: CertainTeed Corporation, Malvern, PA (US)

(72) Inventors: Peter Chihlas, Lansdale, PA (US); Christopher C. Fisher, Philadelphia, PA (US); Gregory F. Jacobs, Oreland, PA (US)

(73) Assignee: CertainTeed Corporation, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,265

(22) Filed: Sep. 21, 2016

(65) Prior Publication Data

US 2017/0159292 A1    Jun. 8, 2017

Related U.S. Application Data

(63) Continuation of application No. 14/275,532, filed on May 12, 2014, now Pat. No. 9,469,992, which is a continuation of application No. 13/015,121, filed on Jan. 27, 2011, now Pat. No. 8,720,132.

(51) Int. Cl.
| *E04C 2/52* | (2006.01) |
| *H02S 20/23* | (2014.01) |
| *H02S 40/36* | (2014.01) |
| *E04D 1/00* | (2006.01) |

(52) U.S. Cl.
CPC .................. *E04C 2/52* (2013.01); *E04D 1/00* (2013.01); *H02S 20/23* (2014.12); *H02S 40/36* (2014.12); *E04D 2001/005* (2013.01); *Y02A 30/255* (2018.01); *Y02B 10/12* (2013.01); *Y02B 10/20* (2013.01); *Y02B 80/34* (2013.01)

(58) Field of Classification Search
None
See application file for complete search history.

(56) References Cited

U.S. PATENT DOCUMENTS

| 3,893,506 A | 7/1975 | Laing |
| 4,189,881 A | 2/1980 | Hawley |
| 5,092,939 A | 3/1992 | Nath et al. |
| 5,391,858 A | 2/1995 | Tourangeau et al. |
| 5,575,861 A | 11/1996 | Younan et al. |
| 5,647,916 A | 7/1997 | Guazzoni |
| 5,961,737 A | 10/1999 | Glenn |
| 5,990,414 A | 11/1999 | Posnansky |
| 6,182,403 B1 | 2/2001 | Mimura et al. |
| 6,311,436 B1 * | 11/2001 | Mimura ................... E04D 1/365 136/251 |

(Continued)

*Primary Examiner* — Jessica L Laux
(74) *Attorney, Agent, or Firm* — McDonnell Boehnen Hulbert & Berghoff LLP (57) ABSTRACT

The present invention relates generally to electrical systems. The present invention relates more particularly to electrical wiring systems suitable for use in roofing applications. One aspect of the invention is a wiring system on a roof comprising a roof deck having a slope and one or more roofing elements disposed on the roof deck, the wiring system including one or more wires extending along the roof on top of the roofing elements; and a wire covering disposed over the one or more wires.

24 Claims, 11 Drawing Sheets

(56) References Cited

U.S. PATENT DOCUMENTS

| | | | |
|---|---|---|---|
| 6,331,671 B1 * | 12/2001 | Makita | H02S 20/23 136/244 |
| 6,465,724 B1 | 10/2002 | Garvison et al. | |
| 6,649,822 B2 | 11/2003 | Eguchi et al. | |
| 6,759,630 B1 * | 7/2004 | Tenute | E04D 13/103 219/213 |
| 6,960,716 B2 | 11/2005 | Matsumi et al. | |
| 6,967,278 B2 | 11/2005 | Hatsukaiwa et al. | |
| 7,681,363 B2 * | 3/2010 | Banister | H02S 40/38 136/244 |
| 8,079,183 B2 | 12/2011 | Lenney | |
| 8,215,070 B2 | 7/2012 | Railkar et al. | |
| 8,863,451 B2 * | 10/2014 | Jenkins | H02S 20/25 52/173.3 |
| 2002/0134421 A1 | 9/2002 | Nagao et al. | |
| 2005/0210806 A1 | 9/2005 | Guerra | |
| 2008/0271773 A1 | 11/2008 | Jacobs et al. | |
| 2008/0271774 A1 | 11/2008 | Kalkanoglu et al. | |
| 2008/0276984 A1 | 11/2008 | Gumm | |
| 2009/0000221 A1 | 1/2009 | Jacobs et al. | |
| 2009/0000222 A1 | 1/2009 | Kalkanoglu et al. | |
| 2009/0000657 A1 * | 1/2009 | Jacobs | E04D 13/15 136/251 |
| 2009/0133340 A1 | 5/2009 | Shiao et al. | |
| 2009/0133738 A1 | 5/2009 | Shiao et al. | |
| 2009/0133739 A1 | 5/2009 | Shiao et al. | |
| 2009/0159118 A1 | 6/2009 | Kalkanoglu | |
| 2009/0179350 A1 | 7/2009 | Kalkanoglu et al. | |
| 2010/0146878 A1 | 6/2010 | Koch et al. | |
| 2010/0170169 A1 * | 7/2010 | Railkar | E04D 1/26 52/173.3 |
| 2010/0180523 A1 | 7/2010 | Lena et al. | |
| 2010/0242381 A1 * | 9/2010 | Jenkins | H02S 20/23 52/173.3 |
| 2010/0275534 A1 | 12/2010 | Ruskin et al. | |
| 2011/0017278 A1 | 1/2011 | Kalkanoglu et al. | |
| 2011/0030761 A1 * | 2/2011 | Kalkanoglu | E04D 5/12 136/245 |
| 2011/0047901 A1 | 3/2011 | Dierbeck | |
| 2011/0314753 A1 | 12/2011 | Farmer et al. | |
| 2012/0085040 A1 | 4/2012 | Ketwitz, Jr. | |
| 2012/0137600 A1 | 6/2012 | Jenkins | |
| 2012/0192509 A1 | 8/2012 | Chihlas et al. | |
| 2012/0192512 A1 | 8/2012 | Gombarick, Jr. | |
| 2012/0210660 A1 | 8/2012 | Livsey et al. | |
| 2012/0222716 A1 * | 9/2012 | Gillenwater | H01L 31/0201 136/244 |
| 2012/0255244 A1 | 10/2012 | Hendrickson et al. | |

* cited by examiner

ELECTRICAL WIRING SYSTEMS FOR USE IN ROOFING APPLICATIONS

CROSS-REFERENCE TO RELATED APPLICATIONS

This application is a continuation of U.S. patent application Ser. No. 14/275,532, filed May 12, 2014, which is a continuation of U.S. patent application Ser. No. 13/015,121, filed Jan. 27, 2011, now U.S. Pat. No. 8,720,132, each of which is hereby incorporated by reference in its entirety.

BACKGROUND OF THE INVENTION

1. Field of the Invention

The present invention relates generally to electrical systems. The present invention relates more particularly to electrical wiring systems suitable for use in roofing applications.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). Moreover, the very discovery and exploitation of fossil fuels carries significant environmental risk. In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such photovoltaic elements are often made from semiconductor-type materials such as doped silicon in either single crystalline, polycrystalline, or amorphous form. The use of photovoltaic elements on roofs is becoming increasingly common, especially as device performance has improved. They can be used to provide at least a significant fraction of the electrical energy needed for a building's overall function; or they can be used to power one or more particular devices, such as exterior lighting systems.

Often perched on an existing roof in panel form, these photovoltaic elements can often be quite visible and generally not aesthetically pleasant. Moreover, the electrical cables used to interconnect the photovoltaic elements can be another source of aesthetic dissonance. Nonetheless, to date, installations have appeared to have been motivated by purely practical and functional considerations; there appears to have been little coordination between the appearance of the photovoltaic system and the roofing materials (e.g., tiles or shingles) and buildings upon which they are mounted. Lack of aesthetic appeal is especially problematic in residential buildings with non-horizontally pitched roofs; people tend to put a much higher premium on the appearance of their homes than they do on the appearance of their commercial buildings.

Accordingly, there remains a need for photovoltaic systems having more controllable and desirable aesthetics for use in roofing applications while retaining sufficient efficiency in electrical power generation, and for aesthetically appropriate building elements for use with photovoltaic systems.

SUMMARY OF THE INVENTION

One aspect of the invention is a wiring system on a roof including a roof deck having a pitch and one or more roofing elements disposed on the roof deck, the wiring system including one or more wires extending along the roof on top of the roofing elements; and a wire covering disposed over the one or more wires.

Another aspect of the invention is a roof-mounted electrical system electrically coupled to a wiring system as described herein.

DETAILED DESCRIPTION OF THE INVENTION

One aspect of the invention is a wiring system on a roof comprising a roof deck having a slope and one or more roofing elements disposed on the roof deck, the wiring system including one or more wires extending along the roof on top of the roofing elements; and a wire covering disposed over the one or more wires.

Figure 1:
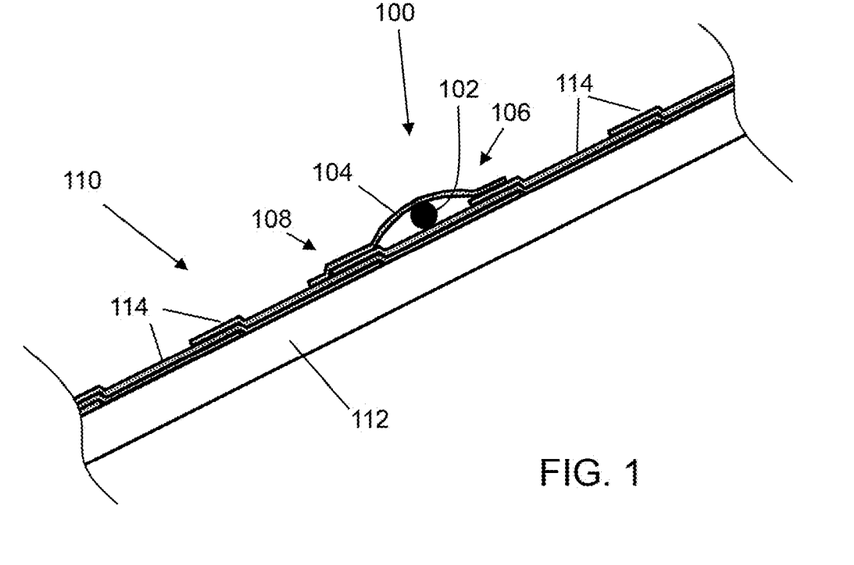
FIG. 1 is a schematic cross-sectional view of a wiring system according to one embodiment of the invention.
Figure 2:
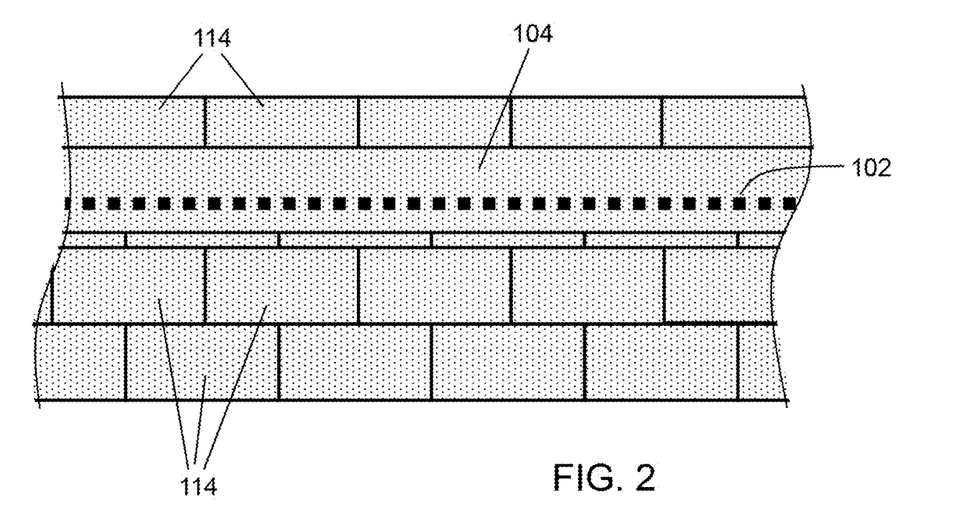
FIG. 2 is a schematic top view of the wiring system depicted in FIG. 1.

One embodiment of the invention is shown in schematic cross-sectional view in FIG. 1 and in top schematic view in FIG. 2. A wiring system 100 is disposed on a roof 110. Roof 110 includes a roof deck 112 with roofing elements 114 disposed thereon, arranged in offset overlapping rows as is familiar to the person of skill in the art. Wiring system 100 includes a wire 102 extending along the roof 110 on top of the roofing elements 114, and a wire covering 104 disposed over the wire 102. In the schematic top view of FIG. 2, wire 102 is shown in dotted line, as it is disposed underneath the wire covering 104.

In certain embodiments of the invention, the wire covering has an up-roof end and a down-roof end, with the up-roof end of the wire covering meeting the roof at a substantially horizontal or down-sloping angle. In the embodiment of FIGS. 1 and 2, the wire covering 104 has an up-roof end 106 and a down-roof end 108. Notably, the up-roof end of the wire covering meets the roof at a down-sloping angle. In this embodiment, the up-roof end of the wire covering lays flat against the roof surface, and therefore has substantially the same slope as the roof. As used herein, the slope of the roof is generally determined as the roof traverses from the ridge toward the eave. When determining whether the up-roof end of the wire covering meets the roof at a down-sloping angle, the thickness of the material of the wire covering is discounted, unless that thickness is greater than half an inch. In such embodiments, snow, ice and water will not collect at the interface between the roof and the wire covering, reducing the amount of moisture that would work its way underneath the wire covering and to the wire. Similarly, debris will not tend to collect at the interface between the roof and the wire covering, reducing the need for people to climb up onto the roof to remove debris.

Figure 3:
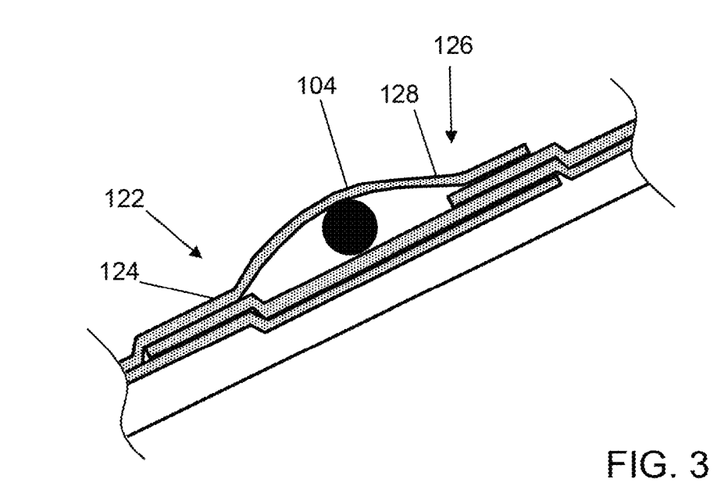
FIG. 3 is a close-up cross-sectional view of the wiring system of FIGS. 1 and 2.

In certain embodiments of the invention, the wire covering forms no up-facing valleys having a substantially up-sloping down-roof end. A close-up cross-sectional view of wiring system 100 is shown in FIG. 3. In this example, wire covering 104 forms two up-facing valleys, 122 and 126. Up-facing valley 122 has a down-roof end 124, and up-facing valley 126 has a down-roof end 128. Notably, both down-roof ends 124 and 128 slope down, with down-roof end 124 sloping down more than does down-roof end 128. As the person of skill in the art will appreciate, in other embodiments, the down-roof end of an up-facing valley can be substantially horizontal. In such embodiments, snow, ice and water will not collect in the up-facing valley, reducing the chance of water-induced failure in the valley, and therefore the amount of moisture that would work its way underneath the wire covering and to the wire. Similarly, debris will not tend to collect at the interface between the roof and the wire covering, reducing the need for people to climb up onto the roof to remove debris.

In certain embodiments, the wire covering traverses a portion of the roof deck laterally, for example, as shown in FIGS. 1 and 2. The wire covering can, for example, run substantially horizontally along a portion of the roof deck.

In the embodiment of FIG. 1, the roofing elements are asphalt roofing shingles. Of course, the person of skill will appreciate that other types of roofing elements can be used in practicing the present invention. Examples of roofing elements suitable for use in this aspect of the invention include shingles, tiles, panels, membranes and shakes, made from such materials as asphalt, polymeric materials, ceramic materials, stone, cementitious materials, and wood. In certain embodiments, a photovoltaic element is integrated with one or more of the roofing elements. The integration can be achieved in many ways, for example as described in U.S. Patent Application Publications nos. 2008/0271773, 2009/0000221, 2009/0000222, 2009/0133340, 2009/0133738, 2009/0133740, 2009/0133739, 2009/0159118, 2009/0178350 and 2010/0146878, and in U.S. Provisional Patent Application Ser. Nos. 61/220,475 and 61/232,739 each of which is hereby incorporated herein by reference in its entirety for all purposes. In certain embodiments, the roof has a pitch of at least about 1"/12", at least about 2"/12", or even at least about 4"/12", about 6"/12", about 8"/12" or about 12"/12".

In certain embodiments, the wire covering is formed from a flexible material. For example, in the embodiment shown in FIGS. 1-3, the wire covering is formed from granule-coated asphalt shingle material. Of course, the wire covering can be formed from other flexible materials, such as thin metal or polymer. In certain embodiments, the roofing elements are flexible roofing elements, such as asphalt shingles, and the wire covering is made from the same material as the flexible roofing elements, such as granule-coated asphalt shingle material. In such embodiments, the thermal behavior of the wire covering can substantially match that of the flexible roofing elements, lessening the degree of thermally-induced failure of the attachment therebetween in certain embodiments. Moreover, the appearance of the wire covering can substantially match that of the flexible roofing elements, making the covering stand out less from the overall aesthetic of the roof.

Figure 4:
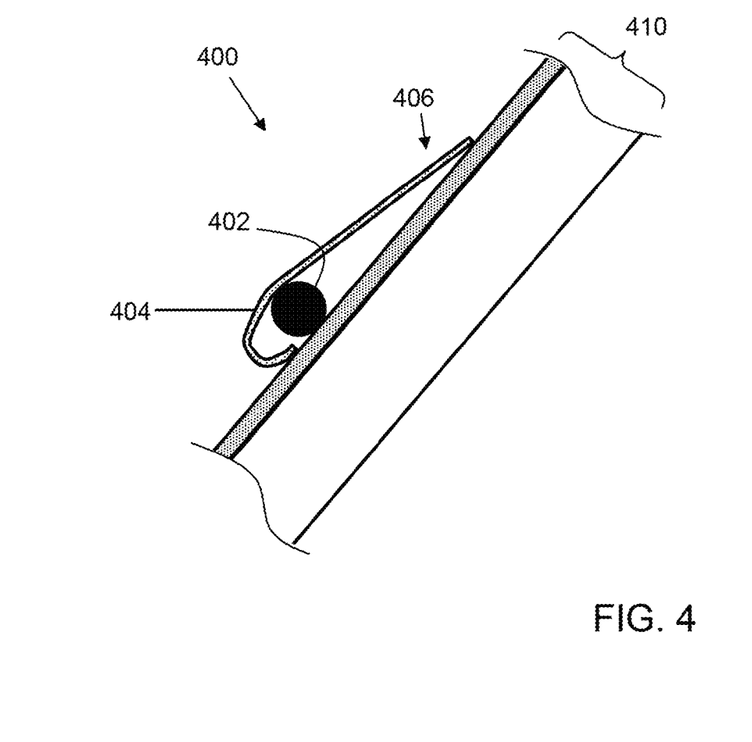
FIG. 4 is a schematic cross-sectional view of a wiring system according to another embodiment of the invention.

Another embodiment of a wire covering formed from flexible material is shown in schematic cross-sectional view in FIG. 4. In wiring system 400, wire 402 is covered by wire covering 404. At its up-roof end 406, wire covering 404 slopes downward, though less sharply than does the roof 410 itself. Wire covering 404 has no up-facing valleys.

Figure 5:
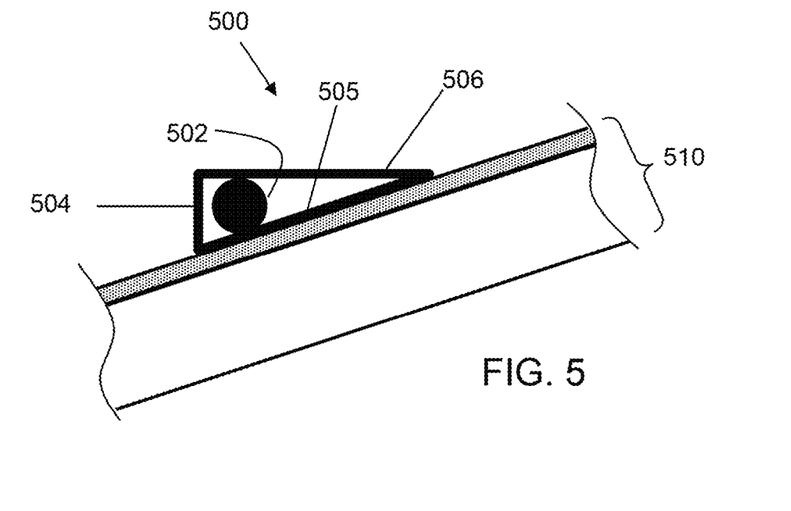
FIG. 5 is a schematic cross-sectional view of a wiring system according to another embodiment of the invention.
Figure 6A:
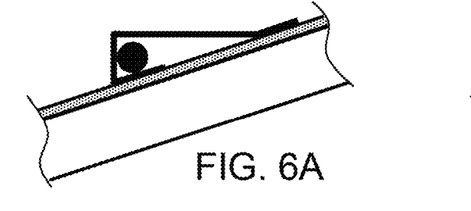
FIG. 6A is a schematic cross-sectional view of another wiring system according to another embodiment of the invention.
Figure 6B:
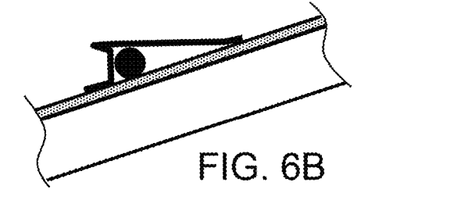
FIG. 6B is a schematic cross-sectional view of another wiring system according to another embodiment of the invention.
Figure 6C:
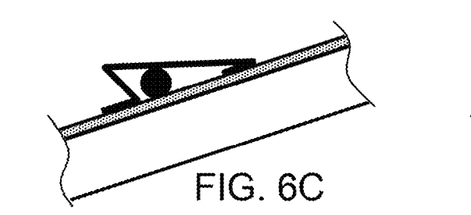
FIG. 6C is a schematic cross-sectional view of another wiring system according to another embodiment of the invention.
Figure 6D:
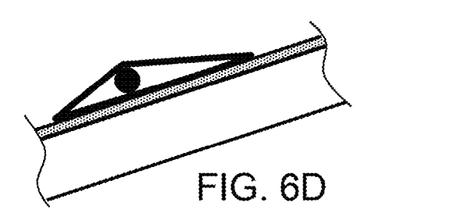
FIG. 6D is a schematic cross-sectional view of another wiring system according to another embodiment of the invention.
Figure 6E:
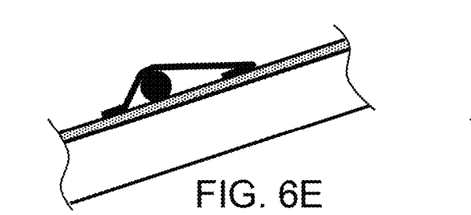
FIG. 6E is a schematic cross-sectional view of another wiring system according to another embodiment of the invention.
Figure 6F:
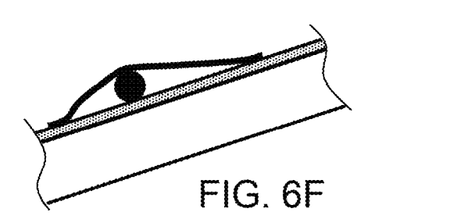
FIG. 6F is a schematic cross-sectional view of another wiring system according to another embodiment of the invention.

In other embodiments, the wire covering is formed from a substantially rigid material. For example, in the wiring system 500 shown in cross-sectional schematic view in FIG. 5, wire covering 504 is formed from a rigid material. In this embodiment, the up-roof end 506 of the wire covering meets the roof at a substantially horizontal angle. Wire covering 504 also includes a portion 505 that lies between wire 502 and roof 510, so that it substantially surrounds wire 502. The substantially rigid material can be, for example, sheet metal, or polymer (e.g., molded, formed or extruded).

Other embodiments of wire coverings are shown in schematic cross-sectional view in FIG. 6. Notably, the angle the down-roof end of the wire covering makes with the roof can be adapted to provide a desired illusion of depth or thickness, particularly when a flexible roofing element overlies it, as described below. Of course, the designs can be adapted to match different roof pitches, and to accommodate different shingle exposures. In certain embodiments, the shape of the wire covering can be designed to make it less of a trip hazard when it is necessary to walk on the roof. For example, in certain embodiments, the wire covering can form only acute angles with the roof (e.g., less than 60°, or less than 45°). In certain embodiments, the wire covering can extend less than about 2″, or even less than about 1″ from the surface from the roof, as measured perpendicularly to the roof surface.

Figure 7:
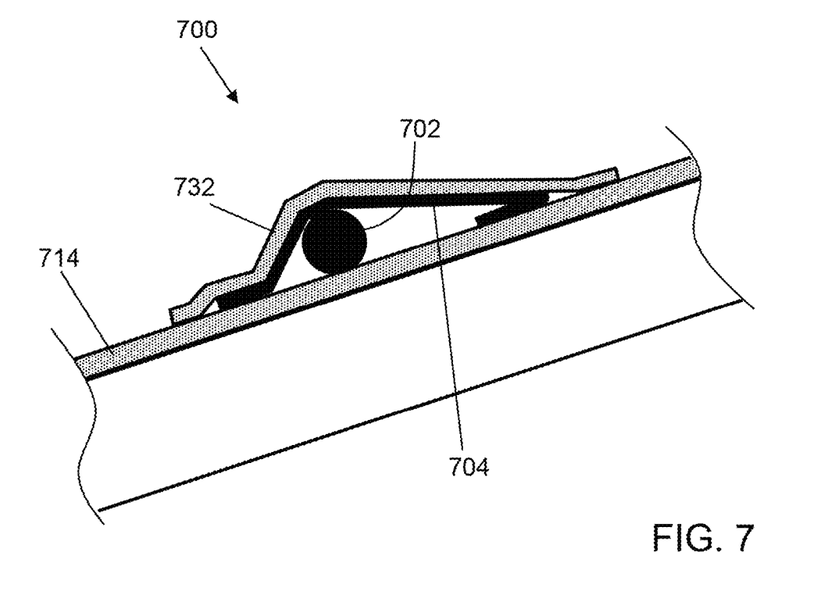
FIG. 7 is a schematic cross-sectional view of a wiring system according to another embodiment of the invention.

In certain embodiments, when the wire covering is not formed from the same material as the roofing elements, it can be covered by the material used to make the roofing elements (e.g., their top surfaces). For example, as shown in schematic cross-sectional view in FIG. 7. In FIG. 7, wiring system 700 includes wiring 702 with wire covering 704 disposed thereon. Disposed on the wire covering is a layer of roofing material 732, which substantially matches the roofing material of roofing element 714. Thus, the roofing material 732 hides the wire covering and provides increased aesthetic matching with the roofing element 714. In certain embodiments, the wire covering is formed from a rigid material. In such embodiments, the wire covering can act to provide mechanical protection for the wiring, without contrasting sharply with the appearance of the roofing elements.

Figure 8:
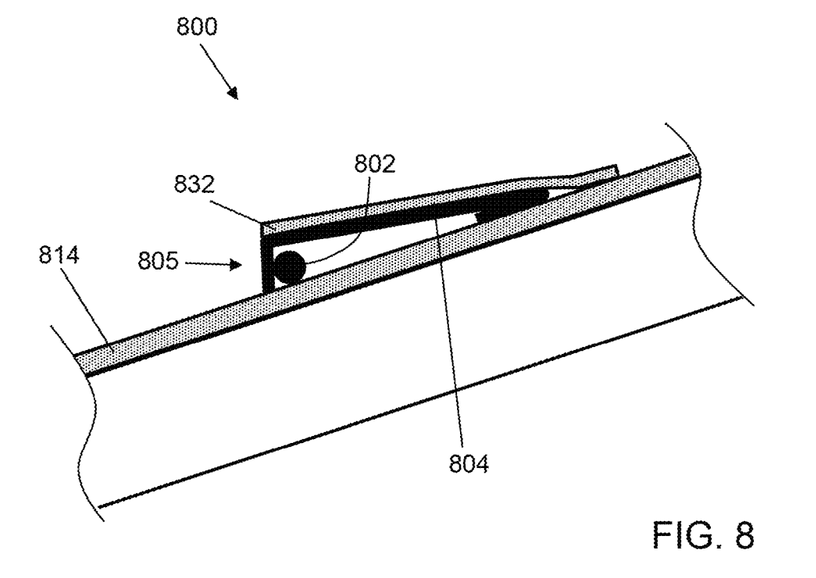
FIG. 8 is a schematic cross-sectional view of a wiring system according to another embodiment of the invention.

When material used to make the roofing elements (e.g., their top surfaces) covers the wire coverings, it need not cover them entirely. For example, as shown in FIG. 8, wire covering 804 is disposed on roofing element 814, covering wire 802 disposed thereon. Disposed on the wire covering is a layer of roofing material 832. In this embodiment, the layer of roofing material covers the top face 806 of wire covering 804, but not its lateral face 805. The lateral face can, for example, provide an appearance of thickness or shadow to the roof. In certain embodiments, the lateral face of the wire covering is printed or patterned to provide a desired aesthetic effect. Of course, in certain embodiments of the invention, a wire covering is covered with material used to make the roofing elements so that it is not exposed, as shown in FIG. 7.

In certain embodiments, the wiring is held by one more or wire holding structures, which is also disposed beneath the wire covering. For example, in the embodiment shown in schematic cross-sectional view in FIG. 9, a wire holding structure 922a holds wire 902a. Wire covering 904a is disposed over the wire, on top of the wire holding structure. The wire holding structure can also give shape to the overlying wire covering, for example, to ensure that it does not collect water (e.g., at the interface with the roof or in any up-facing valleys). For example, in FIG. 9, the wire holding structure 922a is formed from substantially rigid sheet metal, and provides the necessary shape to the wire covering such that it forms no up-facing valleys having an up-sloping down-roof end. Wire 902a can be disposed by flexing the substantially rigid material of the wire holding structure 922a slightly to widen the opening sufficiently to admit the wire.

Figure 9:
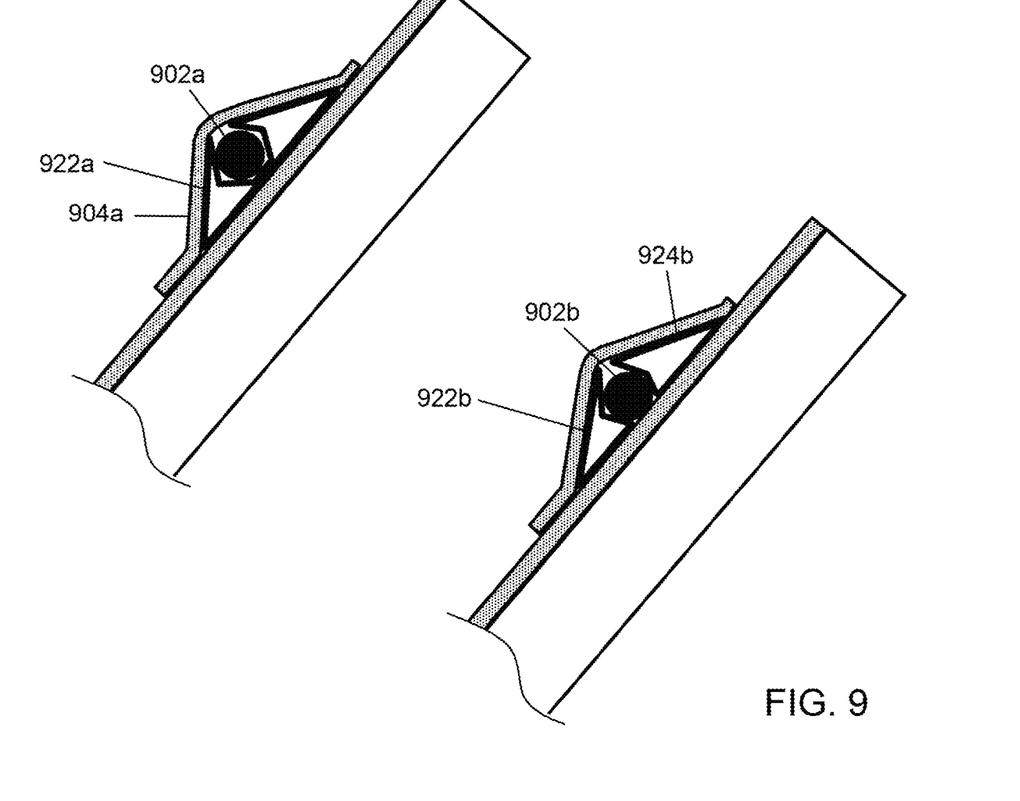
FIG. 9 is a pair of schematic cross-sectional views of wiring systems according to other embodiments of the invention.

In the embodiment of FIG. 9, the wire holding structure extends along the roof with the wire. Of course, as the person of skill in the art will appreciate, wire holding structures can be provided in a number of manners, from the relatively simple to the relatively complex. The wire holding structures can be, for example, a plurality of hooks or clips that engage the wiring at multiple points along its length. In some embodiments, the wire holding structures can be formed from cooperating pieces that act together to hold the wiring in place. For example, in the embodiment shown in schematic cross-sectional view in the right half of FIG. 9, wire holding structures 922b and 924b cooperate to hold wiring 902b.

In certain embodiments, the wire covering itself can include wire holding structures on its roof-facing surface. For example, the wire covering can include clips or hooks on its underside that engage the wiring at multiple points along its length.

Figure 10:
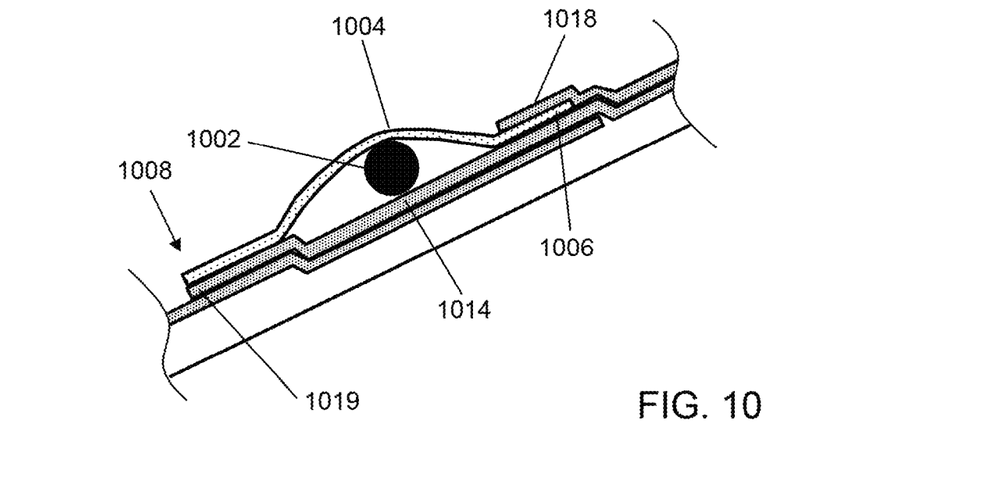
FIG. 10 is a schematic side perspective view of a wiring system according to another embodiment of the invention.
Figure 11:
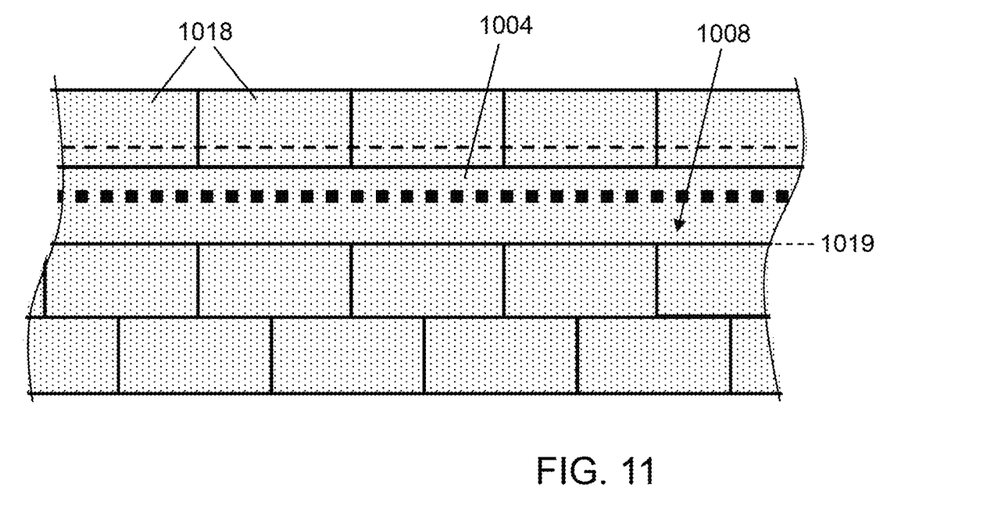
FIG. 11 is a schematic top view of the wiring system depicted in FIG. 10.

In certain embodiments, at least the up-roof end of the wire covering is covered by one or more of another roofing elements. For example, asphalt shingles are conventionally installed with their down-roof ends (e.g., tab regions) laying flat against the roof. As shown in schematic side view in FIG. 10 and schematic top view in FIG. 11, wire 1002 is disposed on roofing elements 1014, and covered by wire covering 1004. The up-roof end 1006 of wire covering 1004 is disposed beneath the down-roof end of roofing element 1018. In such embodiments, the wiring can be better protected from moisture, as water will have a more difficult time working its way underneath the up-roof end of the wire covering.

In certain embodiments, the down-roof end of the wire covering is substantially aligned with the down-roof end of the roofing elements upon which it is disposed. For example, as shown in schematic cross-sectional view in FIG. 10, and in schematic top view in FIG. 11, the down-roof end 1008 of the wire covering 1004 is substantially aligned with the down-roof end 1019 of the roofing elements 1014 upon which it is disposed. Accordingly, the wire covering can blend in with the pattern of the roofing elements, providing a more uniform-looking roof surface.

In certain embodiments, the wire covering is formed from substantially the same material as the roofing elements, so that it matches the roofing elements. In other embodiments, the wire covering is made from a different material but not otherwise covered by roofing material. In certain such embodiments, the wire covering is colored, patterned, or otherwise made to match or complement the appearance of the roofing elements. For example, in certain embodiments, a colored or patterned layer can be provided on the wire covering.

In certain embodiments, the colored or patterned layer includes (either at one of its surfaces or within it) one or more colorants (e.g., dyes or pigments). The colored or patterned layer can also be patterned, in which one or more colors are varied over the area of the layer, for example randomly or in some preselected arrangement. The color(s) and pattern(s) can be selected so that the layer has an appearance that matches, harmonizes with and/or complements a desired type of roofing material, such as asphalt shingles of a given color and design. The pattern of colorant can be, for example, uniform, or can be mottled in appearance. Ink jet printing, digital image printing, laser printing, gravure printing, roll printing, spraying, lithography, or any other suitable printing or coating processes can be used to form the colored or patterned layers for use in the present invention. In some embodiments, a high resolution graphic printing method is employed to replicate the appearance of the surrounding roofing element, or alternatively, the appearance of other structures on the roof (e.g., photovoltaic elements, either integrated with the roofing elements or as stand-alone modules). For example, the colored or patterned layer can approximate the appearance of the roofing substrates (e.g., granule-coated asphalt shingles).

A number of techniques can be used to provide the colored or patterned layer. For example, U.S. Pat. Nos. 5,203,941, 5,284,693, 5,506,031 and 5,662,977, each of which is hereby incorporated by reference herein in its entirety, disclose printed decorative layers disposed beneath a weatherable protective coating. U.S. Pat. No. 6,296,732, which is hereby incorporated herein by reference in its entirety, discloses an extrusion process for print and color coats suitable for imparting decorative aspects to exterior products. U.S. Pat. No. 5,468,532, which is hereby incorporated herein by reference in its entirety, discloses a multilayer article having a graphic layer disposed between a substrate and a protective layer. U.S. Pat. No. 6,180,228, which is hereby incorporated herein by reference in its entirety, discloses a weatherable system having an image layer with a protective layer laminated thereto. U.S. Pat. No. 6,753,065 and U.S. Patent Application Publication no. 2007/0059493, each of which is hereby incorporated herein by reference in its entirety, disclose light-transmissive slip-resistant protective layers for protecting graphic-printed films. U.S. Pat. No. 7,138,173, which is hereby incorporated herein by reference in its entirety, discloses optical films that change color as a function of viewing angle. U.S. Patent Application Publication no. 2008/0006323, which is hereby incorporated herein by reference in its entirety, discloses decorative overlays positioned over photovoltaic elements that can be adapted for use in the present invention.

The wiring covering can be colored and/or patterned to resemble a natural roofing material such wood, slate or stone, or other manmade materials such as ceramic or concrete. For example, in one embodiment of the invention, a graphic print reproducing a natural slate material (i.e., having shading and variegation emulating the natural texture and appearance of slate) is applied to a polymer film to provide the colored or patterned layer. Of course, the wire covering could be colored and/or patterned to have any desired pattern and/or color, and need not look like traditional roofing materials. In certain embodiments of the invention, the wire covering is colored and/or patterned to match the appearance of the roofing element upon which it is disposed.

In other embodiments, the wire covering can have a top-most layer that is formed from material similar to that of the top-most layer of the roofing elements. For example, when the roofing elements are granule-coated asphalt shingles, a top layer of granule-coated asphalt can be formed on the wire covering.

In certain embodiments of the invention, the $\Delta E^*$ between the wire covering and the roofing element is less than 30, less than 20, or even less than 10. As used herein L*, a* and b* are the color measurements for a given sample using the 1976 CIE color space. L*, a* and b* values are measured using a HunterLab Model Labscan XE spectrophotometer using a 0° viewing angle, a 45° illumination angle, a 10° standard observer, and a D-65 illuminant. Lower L* values correspond to relatively darker tones. The strength in color space E* is defined as $E^*=(L^{*2}+a^{*2}+b^{*2})^{1/2}$. The total color difference $\Delta E^*$ between two articles is defined as $\Delta E^*=(\Delta L^{*2}+\Delta a^{*2}+\Delta b^{*2})^{1/2}$, in which $\Delta L^*$, $\Delta^*$ and $\Delta b^*$ are respectively the differences in L*, a* and b* for the two articles.

In certain embodiments, the outer surface of the wire covering is solar reflective. For example, the roofing granules disposed thereon can, for example, be solar reflective granules. Solar-reflective granules can be used, for example, in areas of the wire covering that are to remain exposed to the atmosphere when it is disposed on the roof. In other embodiments, a different solar reflective material is disposed on the outside of the wire covering. The solar-reflective granules or material can operate to reflect a portion of the solar radiation (e.g., in the infrared wavelengths) and thereby decrease the buildup of heat under the wire covering. The effective working temperatures of the wire covering can thereby be lowered, which can be advantageous in maintaining structures under the wire covering at a desirably low temperature. The solar-reflective roofing granules or material can be disposed on the wire covering in an amount sufficient to provide the reflective area with a solar reflectivity greater than about 0.25. In one embodiment of the invention, the solar-reflective roofing granules or material have a solar reflectivity greater than about 0.3, or even greater than about 0.4. Solar reflectance can reduce the effective temperature of the wire covering, which can improve the efficiency of power transfer by a cable disposed thereunder, and can help to prevent thermal failure of the materials used therein. Solar reflective materials are described in U.S. Patent Application Publication no. 2009/0133738, which is hereby incorporated herein by reference in its entirety.

As the person of skill in the art will appreciate, the wire covering can be affixed to the roof in a variety of ways. Conventional fasteners such as nails, staples, adhesives and the like can be used. The wire covering can be formed from a material that can be easily nailed through, such as asphalt shingle material. Of course, nailing tabs or zones can also be provided on the wire covering.

Figure 12:
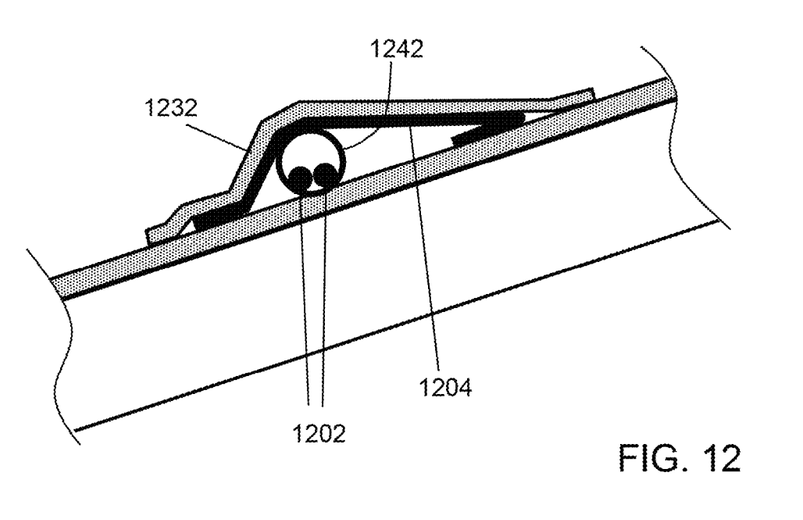
FIG. 12 is a schematic cross-sectional view of a wiring system according to another embodiment of the invention.

The wiring can be provided in many different ways. For example, it can be provided as a single wire or cable, or a bundle of wires or cables. In certain embodiments, the wiring (e.g., as wire or cable) is held within a conduit, over which the wire covering is disposed. For example, as shown in schematic cross-sectional view in FIG. 12, wires 1202 are held within conduit 1242 beneath wire covering 1204 and roofing material 1232. Such embodiments can be advantageous, in that code-approved conduit can be used, ensuring electrical safety and reliability, while providing the advantages described herein.

Figure 13:
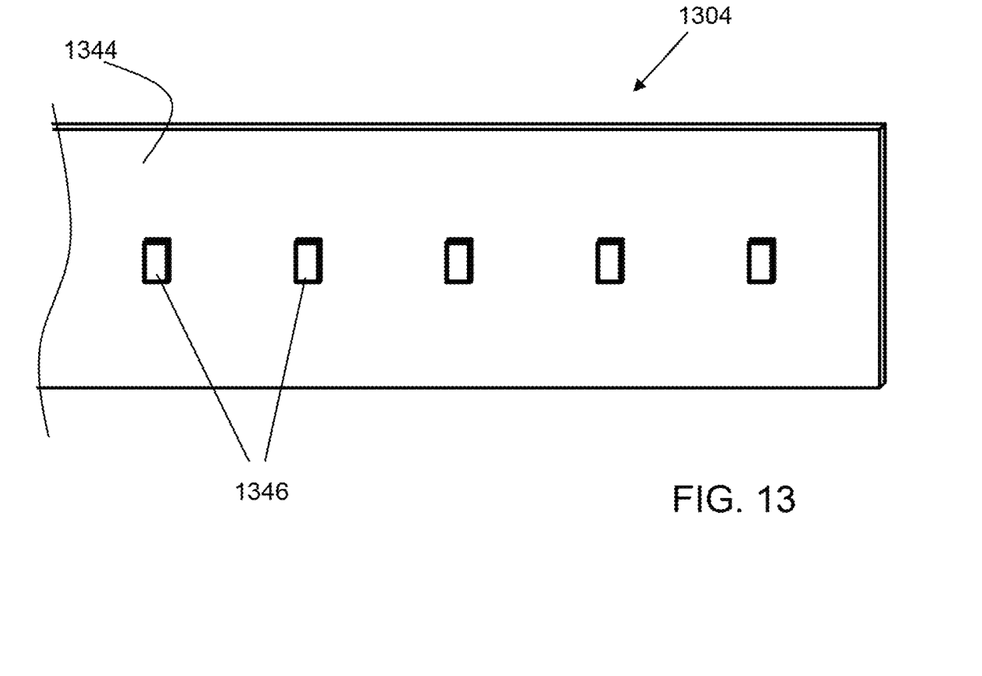
FIG. 13 is a schematic perspective view of the roof-facing surface of a flexible wire cover according to one embodiment of the invention.

In certain embodiments of the invention, the wire covering includes one or more wire holding structures on its roof-facing surface. The one or more wire holding structures can be, for example, one or more wire clips, as shown in FIG. 13 in schematic perspective view of the roof-facing surface of a flexible wire cover 1304. The roof-facing surface 1344 includes clips 1346 that can hold a wire in place along the roof-facing surface. Of course, the person of skill in the art will appreciate that other wire holding structures can also be used in the present invention. For example, in other embodiments of the invention the one or more wire holding structures can be one or more sections of cable holding tray, one or more sections of conduit, or one or more hooks. In other embodiments of the invention, the electrical cable is attached to the roof-facing surface of the wire covering, for example with an adhesive, tape, tacks, or staples. A groove or recess can be formed in the roof-facing surface of the wire covering, in which the wire can be disposed. Such wire holding structures can be especially helpful when a separate conduit is not used, and especially when the wire is jacketed wires (i.e., not protected in cable form).

Figure 14:
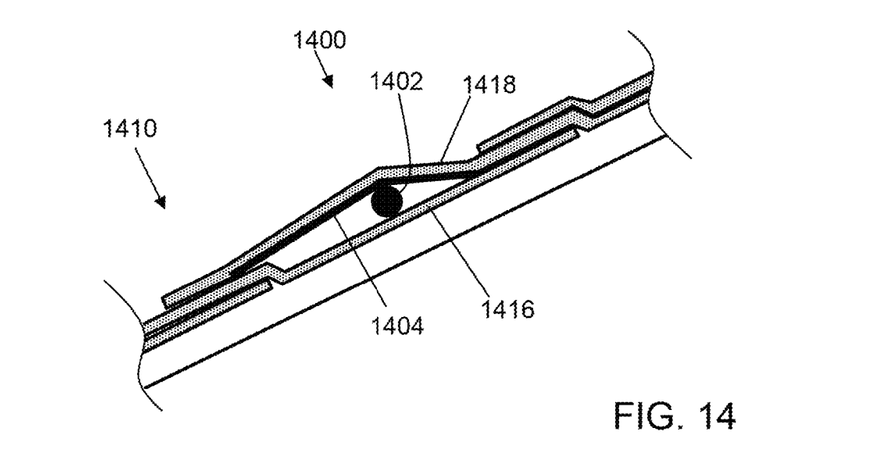
FIG. 14 is a schematic side perspective view of a wiring system according to another embodiment of the invention.
Figure 15:
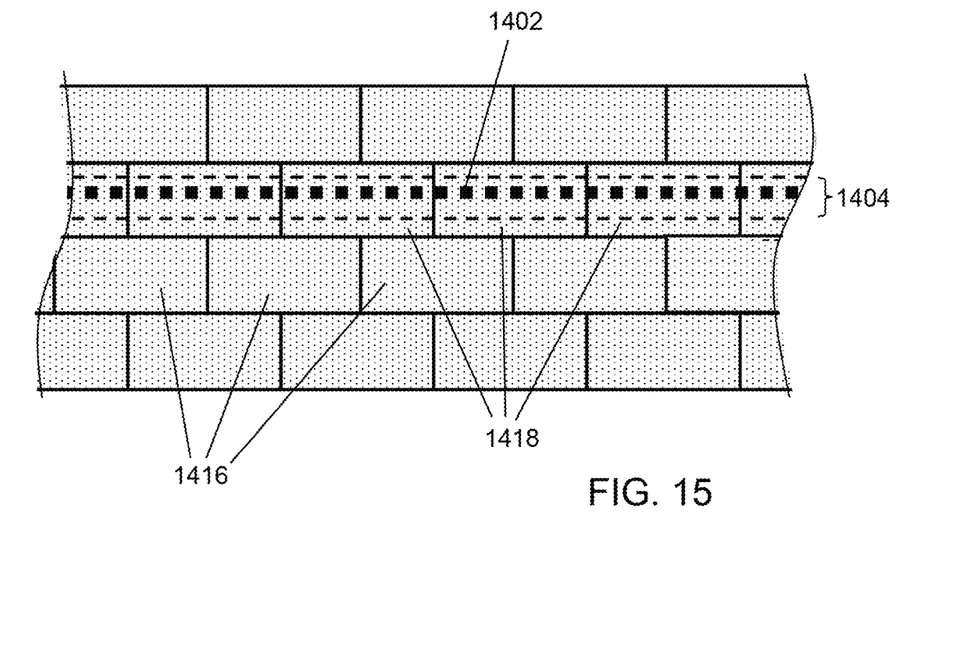
FIG. 15 is a schematic top view of the wiring system depicted in FIG. 14.

In certain embodiments, the wire covering is disposed substantially underneath another roofing element of the roof. For example, in one embodiment, the wire and the wire covering are disposed along a course of roofing elements, and are substantially covered by an overlying course of roofing elements. One such embodiment is shown in schematic cross-sectional view in FIG. 14, and in schematic top view in FIG. 15. Wiring system 1400 includes wire 1402 and wire covering 1404, disposed on roofing elements 1416 of roof 1410. As shown in FIG. 15, roofing elements 1416 are arranged horizontally in a single course along the roof, and the wire 1402 and the wire covering 1404 extend horizontally along them. The wire covering is substantially covered by an overlying course of roofing elements 1418. In such embodiments, the wire can be better protected from moisture, as described above. Additionally, as the wire covering is covered by a roofing element that is arranged in the pattern of roofing elements, it can be substantially hidden from view. The wire covering described above with reference to FIGS. 5-9, for example, can advantageously be used in embodiments in which the wire covering is disposed substantially beneath another roofing element of the roof.

In certain embodiments, the wire covering itself is a roofing element overlying the roofing element upon which the wire is disposed. For example, in one embodiment, the wire is disposed along a course of roofing elements, and the wire covering is an overlying course of roofing elements. One such embodiment is shown in schematic cross-sectional view in FIG. 16, and in schematic top view in FIG. 17. Wiring system 1600 includes wire 1602, disposed on roofing elements 1616 of roof 1610. As shown in FIG. 17, roofing elements 1616 are arranged horizontally in a single course along the roof. The wire covering is formed from an overlying course of roofing elements 1618. The wire can be, for example, disposed within a conduit, as shown by reference number 1607 in FIG. 16. The use of NEC-approved conduit can provide protection to the wire, such that the roofing element is not the only physical protection for the wire. Accordingly, use of conduit can be especially desirable when the roofing elements are flexible roofing elements, such as asphalt shingles.

In certain embodiments as described above with respect to FIGS. 15-17, the overlying roofing element is slightly thicker, in order to accommodate the thickness of the wire and/or wire covering. In certain embodiments, the overly roofing element has a recess formed in its underside, in which the wire and/or wire covering can be at least partially disposed.

Figure 16:
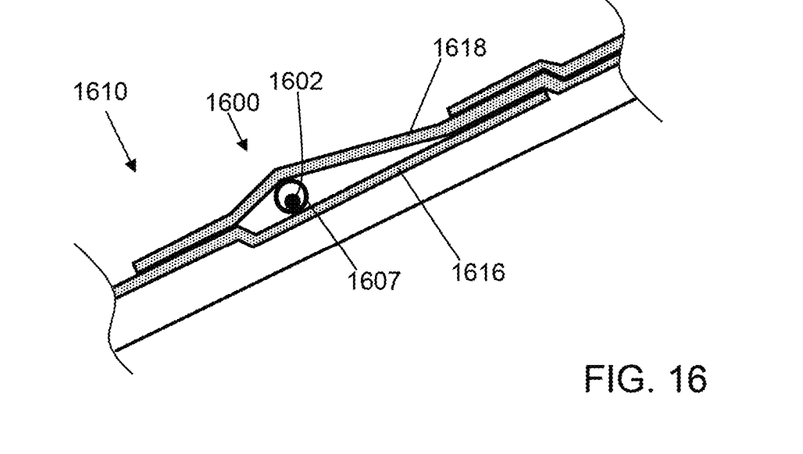
FIG. 16 is a schematic side perspective view of a wiring system according to another embodiment of the invention.
Figure 17:
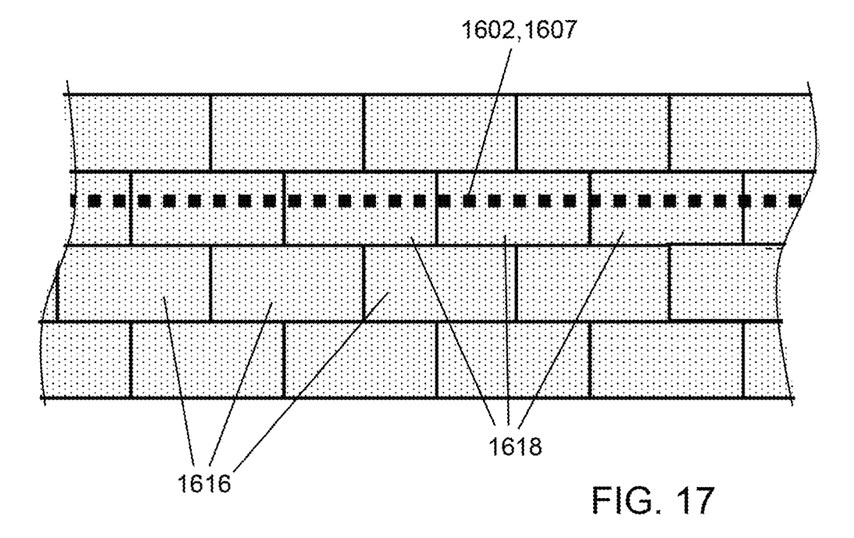
FIG. 17 is a schematic top view of the wiring system depicted in FIG. 16.

In the embodiments of FIGS. 15-17, the wire covering, the wire, or a conduit in which the wire is disposed can be advantageously attached to the roof, with the attachment points being concealed and protected from the elements by the overlying roofing elements.

Figure 18:
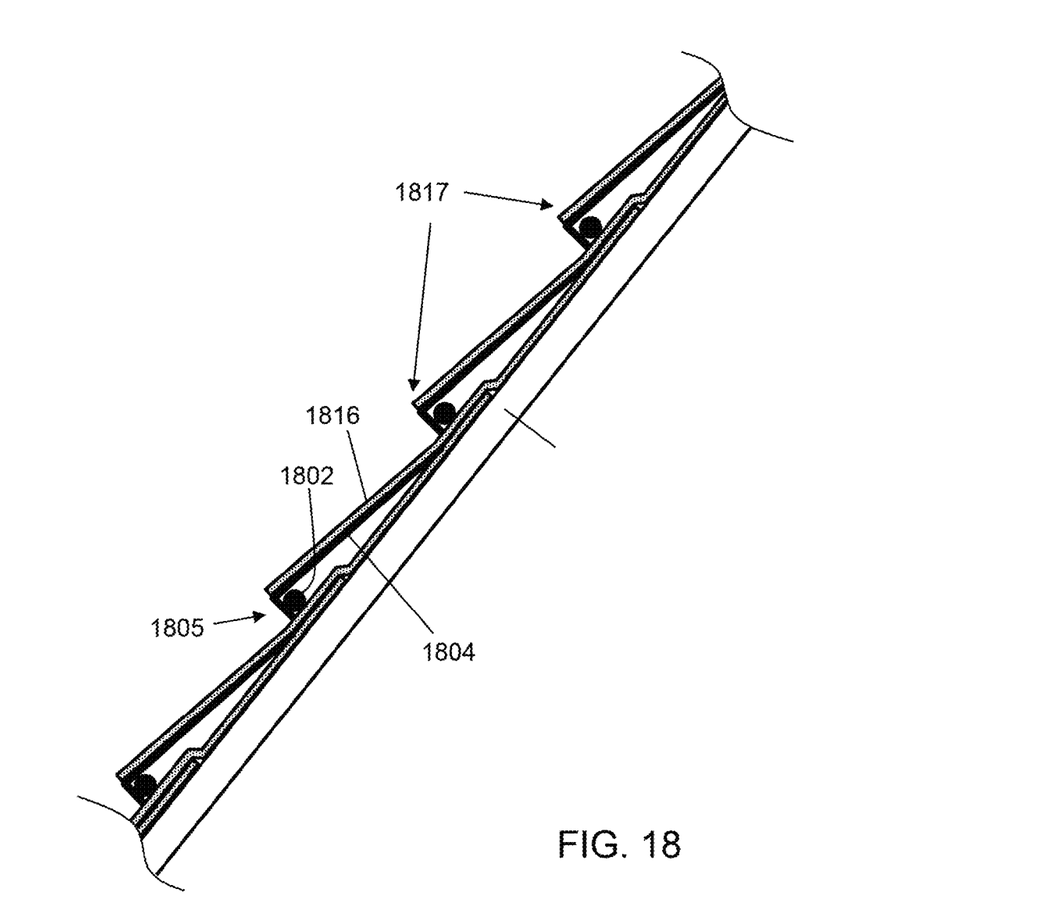
FIG. 18 is a schematic cross-sectional view of a photovoltaic roofing system in conjunction with a wiring system according to one embodiment of the invention.

Another embodiment of a wiring system according to the present invention is shown in cross-sectional schematic view in FIG. 18. Several courses of flexible roofing elements 1816 are shown, disposed on a roof deck 1812. Wire coverings 1804 are disposed underneath the down-roof ends 1817 of each roofing element, covering a wire 1802 disposed on the roofing element of the next course up the roof, as described above with reference to FIG. 14. Notably, in this embodiment, the wire covering is not completely covered by the overlying roofing elements; the lateral face 1805 remains exposed as described above with reference to FIG. 8. Other configurations described above with respect to FIG. 8 can likewise be used in this embodiment.

The wiring systems of the present invention can be used in conjunction with a variety of roof-mounted electrical systems. Accordingly, another aspect of the invention is a roof-mounted electrical system electrically coupled to a wiring system as described herein. An electrical system is one which generates or receives an electrical signal or electrical power. For example, the wiring systems of the present invention can be used in conjunction with (e.g., electrically interconnected with) roof-mounted photovoltaic modules, to interconnect individual modules and/or to connect them to a larger electrical system (e.g., through an inverter). The wiring systems of the present invention can also be used to interconnect individual photovoltaic roofing elements, and/or to connect them to a larger electrical system (e.g., through an inverter). The wiring systems of the present invention can also be used in conjunction with other roof-mounted electrical systems, such as windmills, evaporative coolers, lights, communications equipment such as satellite dishes, or audio equipment. The wiring systems can be made to aesthetically and mechanically integrate with the electrical systems and any other wiring features, for example at the edge of the roof or at a roof penetration.

The wiring systems described herein can be used in conjunction with the photovoltaic systems described in U.S. Patent Application Publications nos. 2008/0271773, 2008/0271774, 2009/0000221, 2009/0000222, 2009/0126782, 2009/0133340, 2009/0133738, 2009/0133740, 2009/0133739, 2009/0159118, 2009/0178350, 2009/0194143, 2009/0205270 and 2009/0242015, 2010/0146878 and 2010/0242831, and in U.S. Provisional Patent Application Ser. Nos. 61/220,475, 61/232,739 61/261,638 and 61/291,954, each of which is hereby incorporated herein by reference in its entirety for all purposes. The wire coverings described herein can be used to cover wire that is within the systems described therein, and additionally or alternatively to cover wire that connects the systems described therein to an electrical system.

Figure 19:
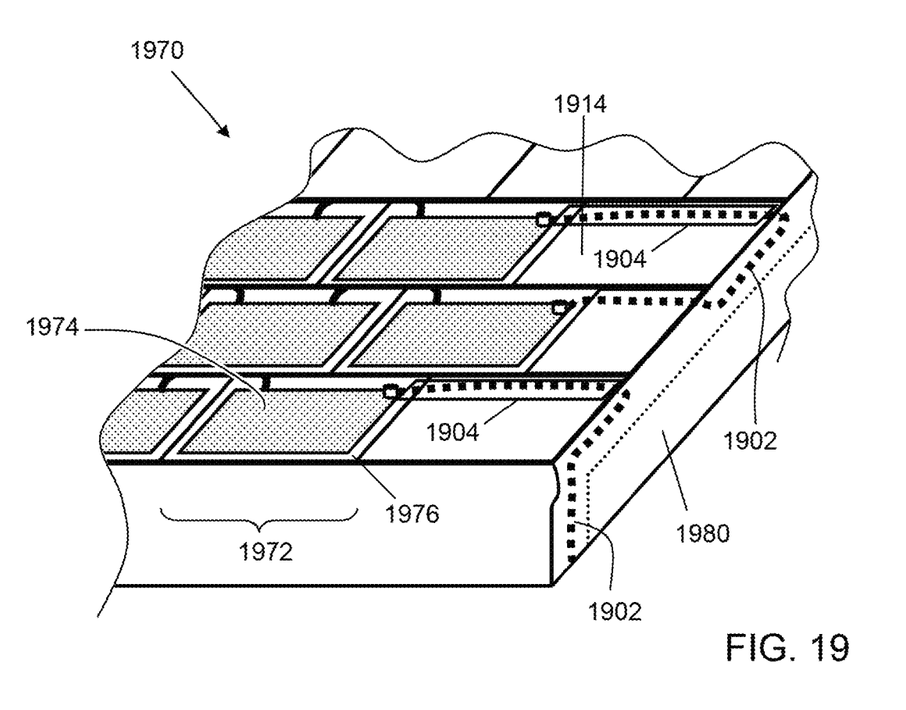
FIG. 19 is a partial schematic perspective view of a photovoltaic roofing system in conjuction with a wiring system according to one embodiment of the invention.

The wiring systems as described herein can be used in conjunction with other building elements that conceal wires or cables. For example, as shown in schematic perspective view in FIG. 19, the wiring systems can be used with a trim strip that covers the wiring, for example, as it runs along the fascia of the roof, as described in more detail in U.S. Patent Application Publication no. 2009/0000657, which is hereby incorporated herein by reference in its entirety. In the photovoltaic roofing system 1970, photovoltaic roofing elements 1972, each including a photovoltaic element 1974 disposed on a roofing substrate 1976, wired together to form the photovoltaic roofing system. Wires 1902 traverse roofing elements 1914 at the edge of the roof, and run along the fascia of the roof underneath trim strip 1980. On the roof, wires 1902 are disposed beneath wire coverings 1904, as described herein.

Figure 20:
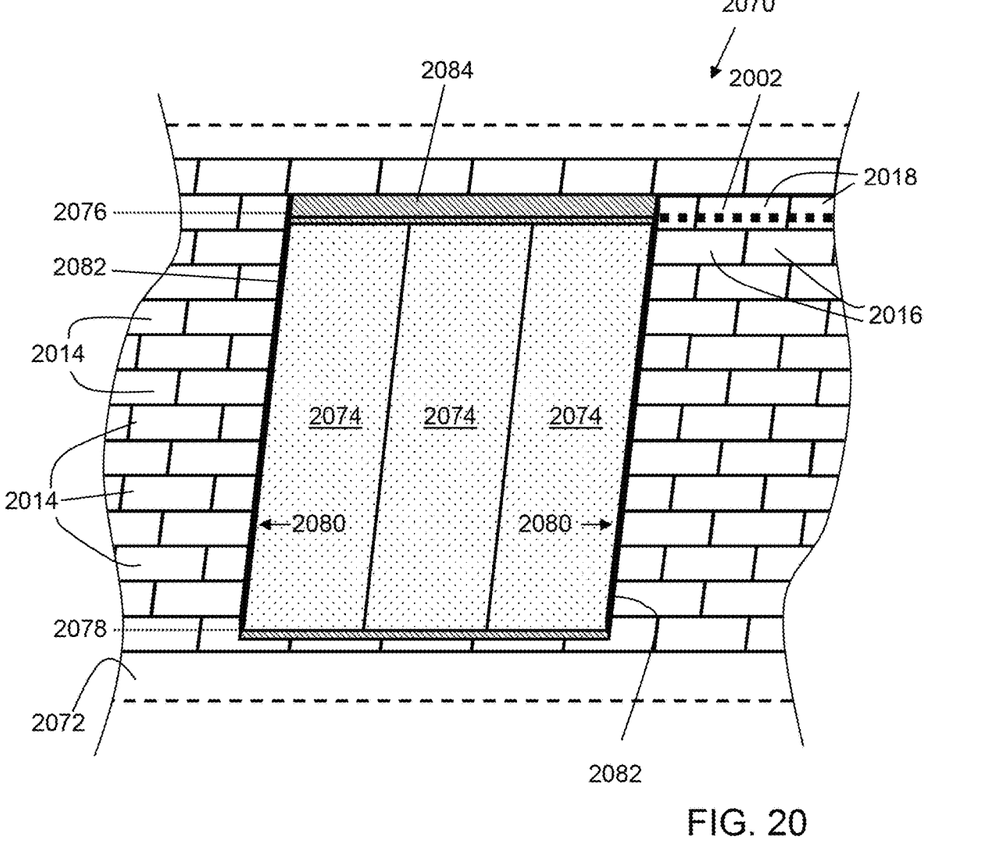
FIG. 20 is a schematic perspective view of a photovoltaic roofing system in conjunction with a wiring system according to one embodiment of the invention.

The wiring systems as described herein can be used in conjunction with the systems described in U.S. Patent Application Publication no. 2010/0242381, which is hereby incorporated herein by reference in its entirety. For example, FIG. 20 shows an example of a wiring system according to the present invention used in conjunction with a photovoltaic roofing system as described in the 2010/0242381 publication. Photovoltaic roofing system 2070 includes a roof deck 2072, upon which one or more (in this case, three) photovoltaic elements 2074 are disposed. The one or more photovoltaic elements (together) have a top edge 2076 facing the upper end of the roof deck; a bottom edge 2078 facing the lower end of the roof deck, and two side edges 2080. The photovoltaic roofing system also includes a plurality of roofing elements 2014 disposed outside the photovoltaic area, along their side edges 2080. In this embodiment, the roofing elements are granule-coated bituminous shingles. Photovoltaic roofing system 2070 also includes linearly-extending side flashing 2082 disposed along the side edges of the contiguously-disposed photovoltaic elements. Wire 2002 connects the photovoltaic elements 2074 to an electrical system (not shown), and is covered by a wire covering as described herein. In the embodiment of FIG. 20, the wire 2002 is disposed on shingles 2016, and the wire coverings are formed from shingles 2018, as described above with reference to FIGS. 16 and 17.

Figure 21:
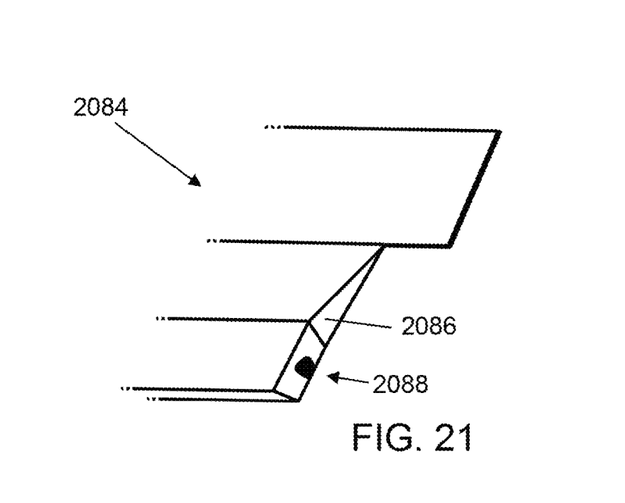
FIG. 21 is a schematic perspective view of an end of a top flashing suitable for use in the photovoltaic roofing system of FIG. 20.

The photovoltaic system can include a top flashing disposed along the top edge of the photovoltaic area, as shown in the embodiment of FIG. 20 by reference numeral 2084. In certain embodiments, the top flashing can include one or more cavities and/or recesses that act as a cover and/or conduit for electrical connectors or cables or other electrical features that protrude from the surface of the photovoltaic elements at their top edges. The end of an example of a top flashing for use with the wiring systems described herein is shown in schematic perspective view in FIG. 21. The top flashing 2084 has a side 2086 that substantially closes off the volume in which the electrical connectors and/or cables associated with the photovoltaic elements. The side 2086 has a hole 2088 formed therein, through which the wiring can emerge, then be covered by the wire covering, as described above with reference to FIG. 20.

Figure 22:
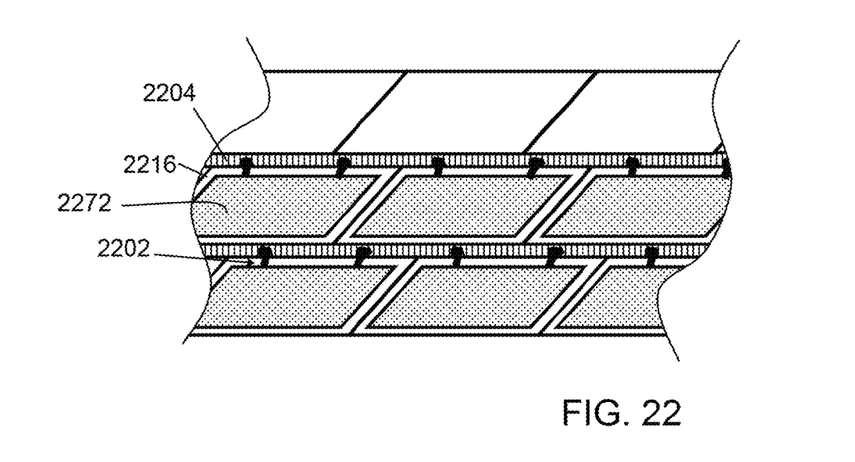
FIG. 22 is a schematic perspective view of a photovoltaic roofing system in conjuction with a wiring system according to another embodiment of the invention.

Another embodiment of a photovoltaic system is shown in schematic perspective view in FIG. 22. The wire covering 2204 and roofing elements 2216 are configured as described above with reference to FIG. 18. The roofing elements have photovoltaic elements (e.g., photovoltaic laminates) 2272 disposed thereon. Wires 2202 connect the photovoltaic elements to one another; each emerges from a photovoltaic element, enters the wire covering through a hole formed therein, and connects to a neighboring wire underneath the wire covering. Of course, other configurations are possible, as the person of skill in the art will recognize. For example, in other embodiments, wires can emerge from the bottom surface of a roofing element, and enter the wire covering disposed beneath the roofing element from its top surface.

Another aspect of the invention is a method for installing a wiring system as described herein on a roof comprising one or more roofing elements disposed on a roof deck, as described herein. The method includes disposing the wire and the wire covering on the roofing elements such that the wire covering covers the wire. In one embodiment, the wire can be disposed on the roofing elements first, then the wire covering formed thereon. In another embodiment, the wire and the wire covering are assembled together, then disposed on the roof.

In one embodiment, the wire covering is formed from one or more another roofing elements disposed on the roof, for example as described above with reference to FIGS. 16 and 17. In such embodiments, the wire (e.g., with a conduit surrounding it) can be inserted between the roofing elements on which it is to be disposed and the overlying roofing elements, after the roofing elements are already installed on the roof. For example, the overlying roofing elements can be lifted and peeled back, and the wire pushed underneath them. The method can be used to retrofit an existing roof with a wiring system.

In another embodiment, the wire covering is substantially covered by one or more another roofing elements disposed on the roof, for example as described above with reference to FIGS. 14 and 15. In such embodiments, the wire and the wire covering can be inserted between the roofing elements on which it is to be disposed and the overlying roofing elements, after the roofing elements are already installed on the roof. For example, the overlying roofing elements can be lifted and peeled back, and the wire and wire covering pushed underneath them. The method can be used to retrofit an existing roof with a wiring system.

Certain aspects of the invention can be further as described in U.S. patent application Ser. No. 13/015,104, filed Jan. 27, 2011, which is hereby incorporated herein by reference in its entirety.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

The invention claimed is:

1. A wiring system on a roof, the roof comprising
   a roof deck having a pitch,
   a first plurality of flexible asphalt roofing shingles, the first plurality of flexible asphalt roofing shingles being disposed in a first horizontally-extending row on the roof deck, the first plurality of flexible roofing elements having an up-roof end and a down-roof end; and
   a second plurality of flexible asphalt roofing shingles, the second plurality of flexible asphalt roofing shingles being disposed in a second horizontally-extending row on the roof deck, the second plurality of flexible asphalt roofing shingles having an up-roof end and a down-roof end, the down-roof end of the second plurality of flexible asphalt roofing shingles overlapping the up-roof end of the first plurality of flexible roofing elements but not the down-roof end of the first plurality of flexible asphalt roofing shingles; and
   the wiring system comprising:
   one or more wires extending along the first horizontally-extending row on top of each of the first plurality of flexible asphalt roofing shingles of the first horizontally-extending row;
   a rigid wire covering extending along the first horizontally-extending row and disposed over each of the first plurality of flexible asphalt roofing shingles and the one or more wires on top of each of the first plurality of flexible asphalt roofing shingles of the first horizontally-extending row, the rigid wire covering having a top face disposed over the one or more wires, at least the top face of the rigid wire covering being covered by an additional layer of flexible asphalt roofing material.

2. The wiring system according to claim 1, wherein the one or more wires are down-roof from the down-roof edge of the second plurality of flexible asphalt roofing shingles.

3. The wiring system according to claim 2, wherein the flexible asphalt roofing material that covers the top face of the rigid wire covering does not overlap or underlap the flexible asphalt roofing shingles of the second plurality of flexible asphalt roofing shingles.

4. The wiring system according to claim 2, wherein the flexible asphalt roofing material that covers the top face of the rigid wire covering overlaps the flexible asphalt roofing shingles of the second plurality of flexible asphalt roofing shingles.

5. The wiring system according to claim 2, wherein the flexible asphalt roofing material that covers the top face of the rigid wire covering has a top surface that is the same as the top surface of the flexible asphalt roofing material of each of the second plurality of flexible asphalt roofing shingles.

6. The wiring system according to claim 5, wherein the flexible asphalt roofing material that covers the top face of the rigid wire covering and the top surface of each of the second plurality of flexible asphalt roofing shingles are granule-coated.

7. The wiring system according to claim 6, wherein the granules are solar reflective.

8. The wiring system according to claim 1, wherein the one or more wires extend horizontally along the first horizontally-extending row.

9. The wiring system according to claim 1, wherein the wire covering continuously covers the one or more wires.

10. The wiring system according to claim 1, wherein the wire covering is a conduit, over which the flexible asphalt roofing material is disposed.

11. The wiring system according to claim 1, wherein the wire covering is formed from a rigid material.

12. The wiring system according to claim 1, wherein the wire covering forms interior angles less than 45° with the roof.

13. The wiring system according to claim 1, wherein the wire covering extends less than about 2" from the surface of the roof, as measured perpendicularly to the roof surface.

14. The wiring system according to claim 1, wherein the wire covering is formed from sheet metal.

15. The wiring system according to claim 1, wherein the wire covering has wire holding structures on a roof-facing surface of the wire covering.

16. The wiring system according to claim 1, wherein the wire covering forms no up-facing valleys having an up-sloping down-roof end.

17. The wiring system according to claim 1, wherein the wire covering is entirely covered by the additional layer of flexible asphalt roofing material.

18. The wiring system according to claim 1, wherein the wire covering has a lateral face down-roof from the top face, and wherein the flexible asphalt roofing material covering the wire covering substantially covers the top face of the wire covering but not the lateral face of the wire covering.

19. The wiring system according to claim 1, wherein the one or more wires and the rigid wire covering extend to a lateral edge of the roof deck, and wherein the one or more wires run from the rigid wire covering to and along an exterior lateral surface of a fascia of the roof and are covered by a fascia trim strip.

20. A roof-mounted electrical system electrically coupled to a wiring system according to claim 1.

21. A wiring system on a roof, the roof comprising
a roof deck having a pitch,
a first plurality of flexible asphalt roofing shingles, the first plurality of flexible asphalt roofing shingles being disposed in a first horizontally-extending row on the roof deck, the first plurality of flexible asphalt roofing shingles having an up-roof end and a down-roof end; and
a second plurality of flexible asphalt roofing shingles, the second plurality of flexible asphalt roofing shingles being disposed in a second horizontally-extending row on the roof deck, the second plurality of flexible asphalt roofing shingles having an up-roof end and a down-roof end, the down-roof end of the second plurality of flexible asphalt roofing shingles overlapping the up-roof end of the first plurality of flexible asphalt roofing shingles; and
the wiring system comprising:
one or more wires extending along the first horizontally-extending row on top of each of the first plurality of flexible asphalt roofing shingles of the first horizontally-extending row;
a rigid wire covering extending along the first horizontally-extending row and disposed over each of the first plurality of flexible asphalt roofing shingles of the first horizontally-extending row and the one or more wires on top of each of the first plurality of flexible asphalt roofing shingles, the rigid wire covering having a top face disposed over the one or more wires, at least the top face of the rigid wire covering being covered by flexible asphalt roofing material, wherein the wire covering continuously covers the one or more wires.

22. The wiring system according to claim 21, wherein the one or more wires are down-roof from the down-roof edge of the second plurality of asphalt roofing shingles.

23. The wiring system according to claim 22, wherein the flexible asphalt roofing material that covers the rigid wire covering has a top surface that is the same as the top surface of the flexible asphalt roofing shingles of each of the second plurality of flexible asphalt roofing shingles.

24. The wiring system according to claim 21, wherein the wire covering forms no up-facing valleys having an up-sloping down-roof end.

* * * * *